Sept. 23, 1969     J. R. SHORT     3,469,066
METHOD AND DEVICE FOR PREVENTING HIGH VOLTAGE ARCING
IN ELECTRON BEAM WELDING
Filed Sept. 30, 1966

INVENTOR.
JOE R SHORT
BY
ATTORNEYS

United States Patent Office 3,469,066
Patented Sept. 23, 1969

3,469,066
METHOD AND DEVICE FOR PREVENTING HIGH VOLTAGE ARCING IN ELECTRON BEAM WELDING
Joe R. Short, Arab, Ala., assignor to the United States of America as represented by the Administrator of the National Aeronautics and Space Administration
Filed Sept. 30, 1966, Ser. No. 584,061
Int. Cl. B23k 15/00
U.S. Cl. 219—121                4 Claims

ABSTRACT OF THE DISCLOSURE

A method and device for preventing high voltage arcing in electron beam welding. A thin metallic shield is positioned between the workpiece and the electron gun so that the electron beam cuts through the metallic shield prior to impinging on the work. Best results are obtained if the shield is positioned above the workpiece within the range of 1/8 inch to 3/4 inch. The electron gun is mounted on a carriage for movement of the gun over the shield and workpiece during the welding operation. The entire electron beam welding apparatus is positioned within a vacuum enclosure.

---

The invention described herein was made by an employee of the U.S. Government and may be manufactured and used by or for the Government for governmental purposes without the payment of any royalties thereon or therefor.

This invention relates generally to electron beam welding and particularly to a method and apparatus for eliminating one of the major problems connected with electron beam welding, that of high voltage arcing.

While electron beam welding is well known and commonly practiced in the welding field, its potentialities for certain applications are just beginning to be realized, and it is the object of much sturdy, experimentation, and development.

Electron beam welding is conducted within an evacuated region, such as a vacuum chamber, and involves the acceleration of a stream of electrons from an electron gun to a workpiece. This manner of welding offers several very important advantages including a high purity, essential in welding reactive metals, such as aluminum alloys, and very high heat concentration at the area to be welded, permitting sound weldment of a high depth to width ratio. These and other attributes of electron beam welding causes this type of welding to be of particular interest and use in the aerospace field in the construction of missiles, rockets, and aircraft.

Heretofore, one of the most serious problems associated with electron beam welding has been the occurrence of intermittent disturbances of the electron beam due to high voltage discharges, commonly referred to as arcing. Although the problem of arcing has been encountered by most practitioners of electron beam welding, its exact cause or causes are not completely understood. It is generally believed, however, that the escaping gases and water vapor emitted from the workpiece during welding form what might be called a conductive cloud that intermittently provides a conductive path from the high voltage components of the welding apparatus to ground. It has been noted that the arcing problem is particularly severe when welding thick aluminum alloys that generate relatively large amounts of metallic vapor and gases during welding.

The effect of high voltage arcing on the quality of the weld depends on the severity and duration of the arcing. A "spike" defect usually appears in the weld at the point where arcing occurs, and if the arcing is of sufficient duration to cause the high voltage circuit to open, the electron beam is momentarily extinguished leaving a hole completely through the weldment.

Accordingly, it is an object of this invention to provide a method and apparatus for suppressing high voltage arcing in electron beam welding.

Another object is to provide in electron beam welding a method and device for preventing weld defects caused by high voltage arcing.

A further object is to provide a method and device for electron beam welding of reactive metals while preventing weld defects caused by high voltage arcing.

Other objects, uses, and advantages of the present invention will become apparent as the description proceeds.

Although, as indicated previously, the precise cause or causes of arcing in electron beam welding are not thoroughly understood, a means of eliminating this problem has been found in accordance with the present invention. Briefly described, the invention comprises a method of electron beam welding wherein the work to be welded is arranged in a vacuum chamber equipped with an electron beam gun, and a beam of electrons is passed from the electron gun to the work while a metallic material, such as a thin metallic sheet or foil, is maintained between the workpiece and the electron gun intersecting the electron beam whereby the electron beam cuts through or penetrates metallic material prior to impinging on the workpiece. The invention also comprises an electron beam welding device including a vacuum chamber equipped with an electron gun and a workpiece support with a metallic shield material disposed in the vacuum chamber between the electron gun and the workpiece support.

In describing the invention in detail, reference will be made to the accompanying drawing in which.

Figure 1:
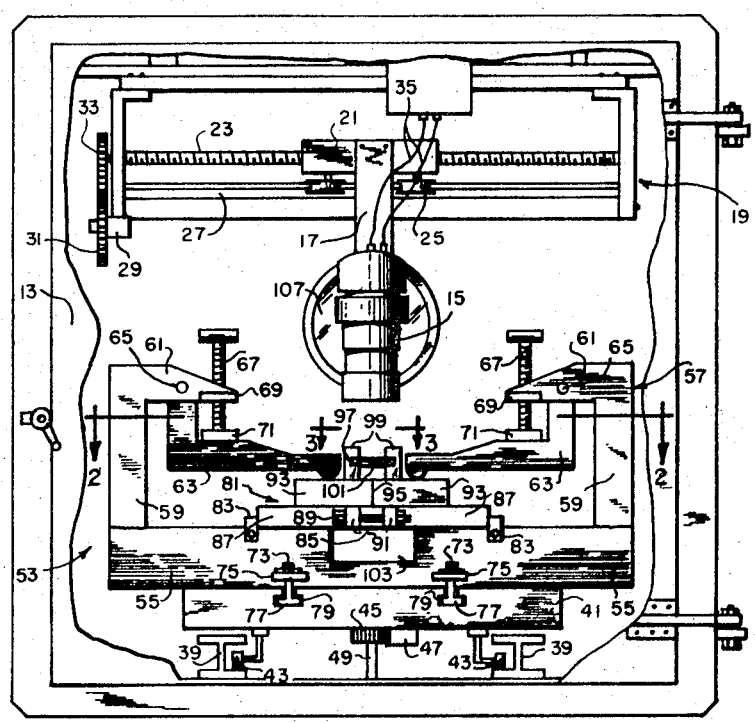
FIGURE 1 is a front elevational view, partially broken away, of a vacuum chamber of an electron beam welding apparatus.

Referring now to FIGURE 1, there is shown a vacuum chamber 11 of an electron beam welding apparatus with an access door 13 cut away to reveal the interior of the vacuum chamber. The chamber 11 contains an electron gun 15 movably suspended approximately along the vertical axis of the chamber by a bracket 17 on a track system 19 installed in the upper region of the vacuum chamber 11. The bracket 17 is connected to a travel block 21 through which a screw 23 is threaded and which carries rollers 25 that roll on a track 27 upon rotation of the screw 23. The screw 23 is actuated by a motor 29 through a gear train including gears 31 and 33. Wires 35 lead from the electron gun 15 to an appropriate high voltage power source (not shown). The details of the electron gun and track system 19 form no part of the present invention and will not be described in further detail.

Mounted on the bottom of the vacuum chamber 11 are spaced parallel tracks 39 that support a carriage bed 41 through rollers 43. Movement of the carriage bed over the tracks 39 is effected by a cog wheel 45 meshed with a rack 47 connected to and extending the length of the carriage bed 41. A shaft 49 is joined to the cog wheel and is rotated by a motor (not shown) mounted beneath the vacuum chamber 11.

Bearing on the carriage bed 41 is a frame unit 53 including a series of spaced parallel cross beams or bars 55. At each end of each cross beam 55 is connected, as by welding, a bracket 57 that has a vertical portion 59 and an inwardly directed horizontal portion 61. Clamps 63 are located between the brackets 57, being pivotally connected to pins 65 extending between and through the brackets 57. Clamping pressure of the clamps 63 is exerted by screws 67 supported by an threaded through bars 69 extending between the brackets 57. The ends of the screws 67 bear on plates 71 welded to the respective clamps 63.

The frame unit 53, comprising the cross beams 55, brackets 57 and clamps 63, is secured to the carriage bed 41 by clamp bolts 73 mounted in plates 75 welded to the respective cross beams 55. The bolts 73 threadedly engage movable nuts 77 that slide within slots 79 in the carriage bed 41.

A workpiece support 81 rests on the cross beams 55, being retained in position by stops 83 removably clamped to the beams 55 and abutting the opposite edges of the workpiece support 81. In order to provide for a slot 85 in the workpiece support to coincide with the joint to be welded, the workpiece support comprises two separable plates 87 that are adjustably spaced apart by bolts 89 threaded in opposed projections 91 at the ends of the plates 87.

The work to be welded is arranged on the workpiece support 81 and comprises metallic components 93 set up for a square butt joint weld along a meeting line 95, with clamps 63 holding the components 93 in position. Overlying the meeting line 95 and supported in slots 97 of spacers 99 is a metallic shield 101. The shield 101 is quite thin relative to the components 93 and is spaced above the components 93 between ⅛ inch and ¾ inch. The shield material, as well as the optimum thickness range for the shield, and the distance it is spaced from the workpiece will be discussed more fully hereinafter. Directly below the meeting line 95 and the slot 85, aligned recesses 103 are formed in the cross beams 55.

In the electron beam welding operation, the work, such as metallic components 93, are arranged as described above within the vacuum chamber 11 and the electron gun 15 is focused on the meeting line 95. After the vacuum chamber is closed and evacuated an electron beam produced by the electron gun 15 is passed from the gun through the shield 101 and then strikes and penetrates the workpiece at the meeting line 95, the high heat concentration resulting in a melting and fusion of the abutting edges of the components 93. The work is moved by the carriage bed at a predetermined and constant rate beneath the electron gun 15 until the full length of the joint to be welded has intersected the electron beam. The shield 101 extends the full length of the joint to be welded so that the electron beam always penetrates metallic material of the shield before impinging on the work, leaving a narrow slot 105 (FIGURE 3) in the shield 101. The welding operation is observed through observation windows 107 located in the walls and door of the vacuum chamber 11.

Figures 2, 3, 4:
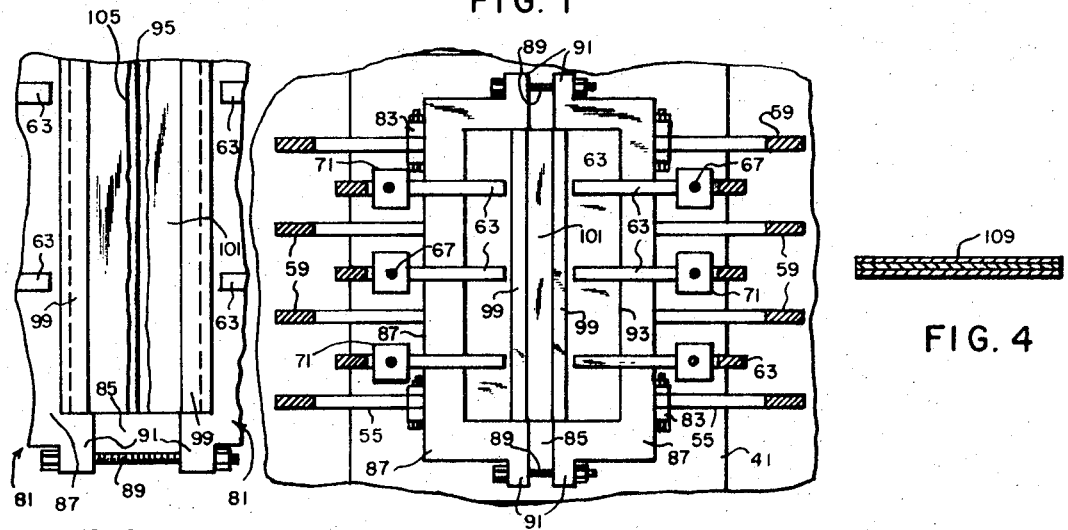
FIGURE 2 is a fragmentary cross sectional view taken along line 2—2 of FIGURE 1.
FIGURE 3 is a fragmentary cross sectional view, somewhat enlarged, taken along line 3—3 of FIGURE 1 subsequent to an electron beam welding operation.
FIGURE 4 is a cross sectional view of a metallic shield that may be used in practicing the invention.

Experiments have revealed that excellent results are obtained with a shield as thin as 0.015 inch and such a shield may comprise three thicknesses of 0.005 inch thick aluminum foil 109 shown in FIGURE 4. Much thicker shields are also completely effective in eliminating arcing, and aluminum strips up to ⅛ inch thick have been satisfactory when welding one inch thick aluminum work.

As to the distance the shield should be spaced above the work, it has been found that best results are obtained in the range of ⅛ inch to ¾ inch. If the shield is positioned much closer than ⅛ inch to the work there is a possibility that the shield will become fused to the work, and if the shield is removed from the work more than ¾ inch arcing may occur, and severe arcing has been experienced when the distance between the workpiece and the shield was 1½ inches.

Ordinarily, the shield material will be selected to correspond at least generally to the material of the work. For example, if the work is aluminum alloy the shield material would be aluminum foil or aluminum strip.

Since, as indicated in the prefatory discussion, the exact cause of arcing in electron beam welding is not completely understood, the preventive effect of a shield used in accordance with the invention is likewise not thoroughly comprehended. It is thought that the action of the electron beam penetrating the shield causes an electrical potential to build up on the shield which potential restricts the radiation of electrons from the workpiece and thus prevents arcing.

Obviously, numerous modifications and variations of the present invention are possible in the light of the above teachings. Thus, it is to be understood that within the scope of the appended claims the invention may be practiced otherwise than specifically described herein.

What is claimed is:

1. The method of welding with an electron beam welding apparatus having a vacuum enclosure and an electron beam source for producing an electron welding beam within said vacuum enclosure comprising:
   (a) arranging a work to be welded within said vacuum enclosure;
   (b) focusing said electron beam source toward a point on a weld path of said work;
   (c) producing relative movement between said electron beam source and said work by mounting the work on a carriage which moves the work beneath the electron beam source while passing an electron welding beam from said electron beam source to said work;
   (d) continuously intersecting said beam with a continuous metallic shield maintained a distance of between ⅛ inch and ¾ inch from said work and carried by said carriage whereby said beam penetrates said shield before impinging on said work during relative movement of the beam source to the continuous metallic shield and work.

2. The method of claim 1 wherein said work is aluminum alloy and said shield comprises aluminum foil.

3. In an electron beam welding apparatus comprising a vacuum chamber adapted to enclose a work to be welded, and having means for producing an electron welding beam within said vacuum chamber and impinging said beam on a work to be welded within said vacuum chamber;
   (a) a continuous metallic shield having a thickness which does not exceed ⅛ inch mounted along the entire weld seam within said vacuum chamber in the path of said welding beam with a solid metallic portion of said shield being in the path of said electron welding beam whereby during a welding operation said beam will penetrate said solid portion of said shield before impinging on said work;
   (b) said shield being spaced from said work a distance of between ⅛ inch and ¾ inch;
   (c) means for producing relative movement between said welding beam and said work;
   (d) means for continuously intersecting a solid portion of said shield with said welding beam during said relative movement.

4. The invention as defined in claim 3 wherein said shield comprises aluminum foil and wherein the thickness of said shield is not less than 0.015 inch.

References Cited

UNITED STATES PATENTS

| | | | |
|---|---|---|---|
| 2,899,556 | 8/1959 | Schopper et al. | 219—121 |
| 3,132,198 | 5/1964 | DuBois et al. | 219—121 |

(Other references on following page)

UNITED STATES PATENTS

| | | | |
|---|---|---|---|
| 3,291,959 | 12/1966 | Schleich et al. | 219—121 |
| 3,327,090 | 6/1967 | Greene | 219—121 |
| 2,907,704 | 10/1959 | Trump | 219—121 |
| 3,112,391 | 11/1963 | Sciaky | 219—121 |
| 3,136,882 | 6/1964 | Radtke | 219—121 |
| 3,136,883 | 6/1964 | Radtke | 219—121 |
| 3,174,026 | 3/1965 | Bowers et al. | 219—117 |
| 3,219,792 | 11/1965 | Pederson | 219—121 |
| 3,340,377 | 9/1967 | Okazaki et al. | 219—121 |

JOSEPH V. TRUHE, Primary Examiner

W. D. BROOKS, Assistant Examiner

U.S. Cl. X.R.

219—69

UNITED STATES PATENT OFFICE
CERTIFICATE OF CORRECTION

Patent No. 3,469,066                          September 23, 1969

Joe R. Short

It is certified that error appears in the above identified patent and that said Letters Patent are hereby corrected as shown below:

In the heading to the printed specification, lines 5 to 7, "Joe R. Short, Arab, Ala., assignor to the United States of America as represented by the Administrator of the National Aeronautics and Space Administration" should read -- Joe R. Short 705 Guntersville Road, Arab, Ala. 35016 --.

Signed and sealed this 15th day of September 1970.

(SEAL)
Attest:

Edward M. Fletcher, Jr.

Attesting Officer

WILLIAM E. SCHUYLER, JR.

Commissioner of Patents